United States Patent [19]

Schemel et al.

[11] Patent Number: 4,489,497
[45] Date of Patent: Dec. 25, 1984

[54] GROOVE MEASURING GAUGE

[75] Inventors: John H. Schemel; A. Bruce Cady, both of Kennewick, Wash.

[73] Assignee: Sandvik Special Metals Corp., Kennewick, Wash.

[21] Appl. No.: 475,192

[22] Filed: Mar. 14, 1983

[51] Int. Cl.³ .............................................. G01B 7/00
[52] U.S. Cl. ............................... 33/172 E; 33/174 L; 33/178 E
[58] Field of Search ............. 33/174 P, 174 R, 174 L, 33/174 Q, 172 E, 178 E, 178 R, 147 K, 148 R, 148 H

[56] References Cited

U.S. PATENT DOCUMENTS

| | | |
|---|---|---|
| 2,599,835 | 6/1952 | Johnson et al. |
| 2,706,340 | 4/1955 | Jhnston. |
| 2,723,461 | 11/1955 | Reason et al. |
| 2,821,023 | 1/1958 | Mims. |
| 3,237,312 | 3/1966 | Boppel .......................... 33/174 L X |
| 3,267,579 | 8/1966 | House et al. |
| 3,741,659 | 6/1973 | Jones, Jr. |
| 3,750,295 | 8/1973 | Nordmann et al. ............. 33/174 L |
| 3,823,482 | 7/1974 | Schiler. |
| 4,166,323 | 9/1979 | Maag. |
| 4,170,830 | 10/1979 | Weber. |
| 4,276,699 | 7/1981 | Sterki et al. |
| 4,285,133 | 8/1981 | Sterki et al. |
| 4,297,788 | 11/1981 | Sterki et al. |

FOREIGN PATENT DOCUMENTS 1174117 3/1959 France.
268668 7/1970 U.S.S.R. .......................... 33/174 Q Primary Examiner—Harry N. Haroian
Attorney, Agent, or Firm—Wells, St. John & Roberts

[57] ABSTRACT

Disclosed is a groove measuring gauge. The gauge has a centering headpiece and centering tailpiece for supporting a die or other workpiece mounted upon an arbor. Two guideways are used to position a gauge head near the workpiece containing the groove being measured. The gauge head has a spindle rotatably mounted therein. The spindle includes a measuring arm which extends from an interior cavity in the spindle. The measuring arm is pivotably mounted in the spindle. The exposed end of the measuring arm contacts the inside surfaces of the groove. A micrometer is mounted upon the spindle and connected to the enclosed end of the measuring arm. As the measuring arm pivots the micrometer measures the distance from the spindle axis to the surface of the groove. The spindle is preferably automatically moved to angular positions by a stepping motor. Micrometer readings are taken at each position and the profile of the groove is determined from these measurements. The die or workpiece can be rotated by the centering headpiece to allow the groove shape to be measured at a number of different cross-sectional locations about the periphery of a circular die or other workpiece. The groove measuring gauge is preferably connected to a computer control and data storage system for automatically positioning the gauge and automatically recording the groove measurements.

18 Claims, 9 Drawing Figures

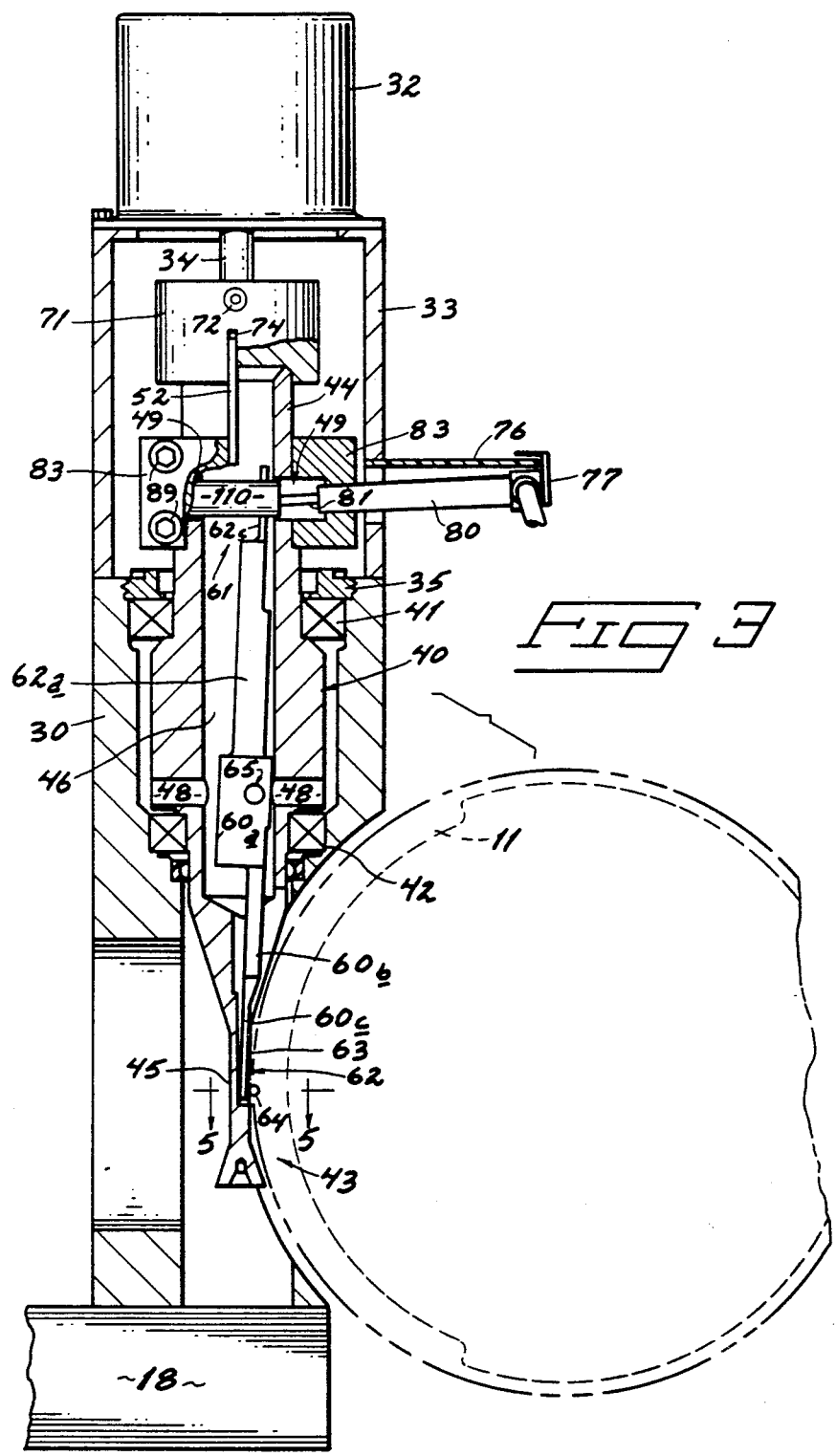

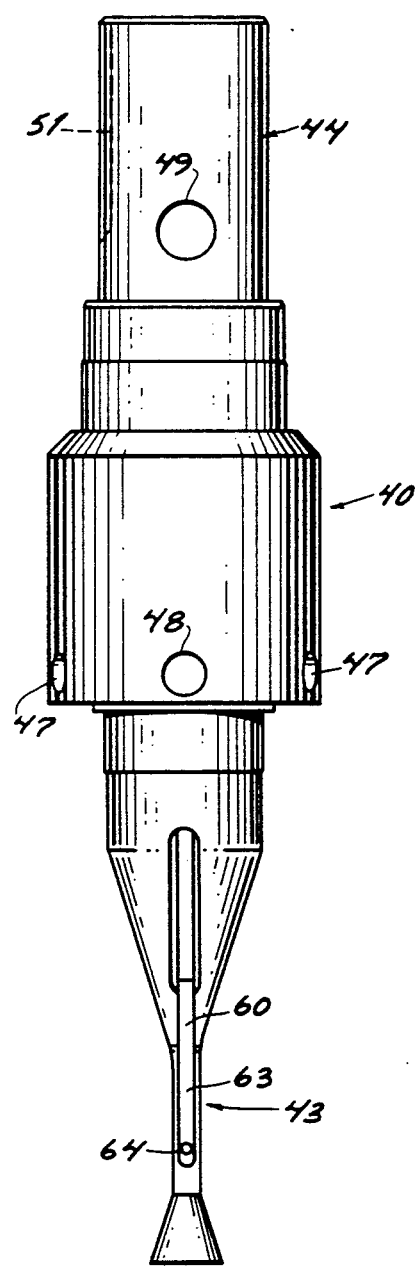
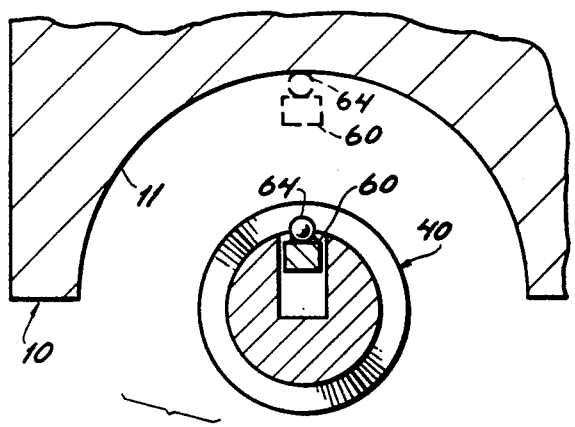
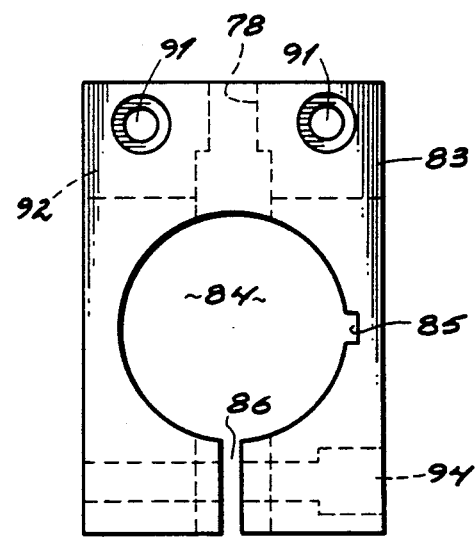

GROOVE MEASURING GAUGE

TECHNICAL FIELD

The technical field of this invention is measuring gauges for grooves or other interior contours, especially gauges for measuring the contours of grooves in dies used in the manufacture of thin wall tubing.

BACKGROUND OF THE INVENTION

Measuring gauges are a common necessity in many manufacturing processes. In the manufacture of thin wall seamless tubing it is common to use a mill sometimes called a pilger mill which has two relatively thick disk shaped dies. These dies have grooves along the outer periphery of the die which work upon the outer surfaces of the tubing so as to reduce the wall thickness and diameter. A mandrel is usually inserted into the interior of a tube to maintain the inside diameter.

In many applications outside surface finish of tubing is critical and wall thickness and diameter must be maintained to within very close tolerances. In order to produce such exacting tubing it is necessary to have even more exacting groove shapes in the disk shaped dies. Previously, it has been common for small approximately semicircular disk gauges to be placed transversely into the groove and a visual examination is made for light leakage between the gauge and the groove in order to assure that the die is properly shaped and sized for the manufacturing process. Such visual inspection of the die grooves has been found unacceptable in many instances where tubing having very close tolerances must be manufactured. Visual inspection using such a gauge has been able to produce groove dimensions having tolerances within approximately .0005 inches.

Another limitation of the prior art involved the need to measure die grooves which were noncircular in cross-sectional shape. Since it is difficult to produce gauges having a noncircular shape, it was even more difficult to use these gauges to produce a properly shaped noncircular groove in the edge of the die.

Prior art gauges have also suffered from the limitation that data could not very easily be produced and stored concerning the interior contour shape of the die grooves. Such information is useful to analyzing the die wear patterns and rates of wear, so that improvements can be made in die design.

Mechanical gauges having the ability to measure interior contours are shown in the prior art but have all suffered from limitations in accuracy because of the various structures used for probing, detecting and transmitting the measurements. The current invention minimizes the amount of measurement error through a number of novel improvements which will be fully described below. Other objectives and features of the invention will also be apparent from the following description.

BRIEF DESCRIPTION OF THE DRAWINGS

A preferred embodiment of this invention is illustrated in the accompanying drawings, in which:

FIG. 3 is a partial cross-sectional view taken substantially along line 3—3 of FIG. 2; portions have been shown in elevation as well as in section, to enhance the meaning of the drawing; the die is shown in phantom;

FIG. 4 is an enlarged view of the spindle of FIG. 3 apart from other parts of the gauge;

FIG. 5 is a partial cross-sectional view taken along line 5—5 of FIG. 3; portions have been removed for clarity of presentation;

FIG. 6 is an enlarged view of the micrometer mounting block shown in FIG. 3 apart from other parts of the gauge;

DESCRIPTION OF THE PREFERRED EMBODIMENTS

In compliance with the constitutional purpose of the Patent Laws "to promote the progress of science and useful arts" (Article 1, Section 8), applicant submits the following disclosure of the invention.

Figure 1:
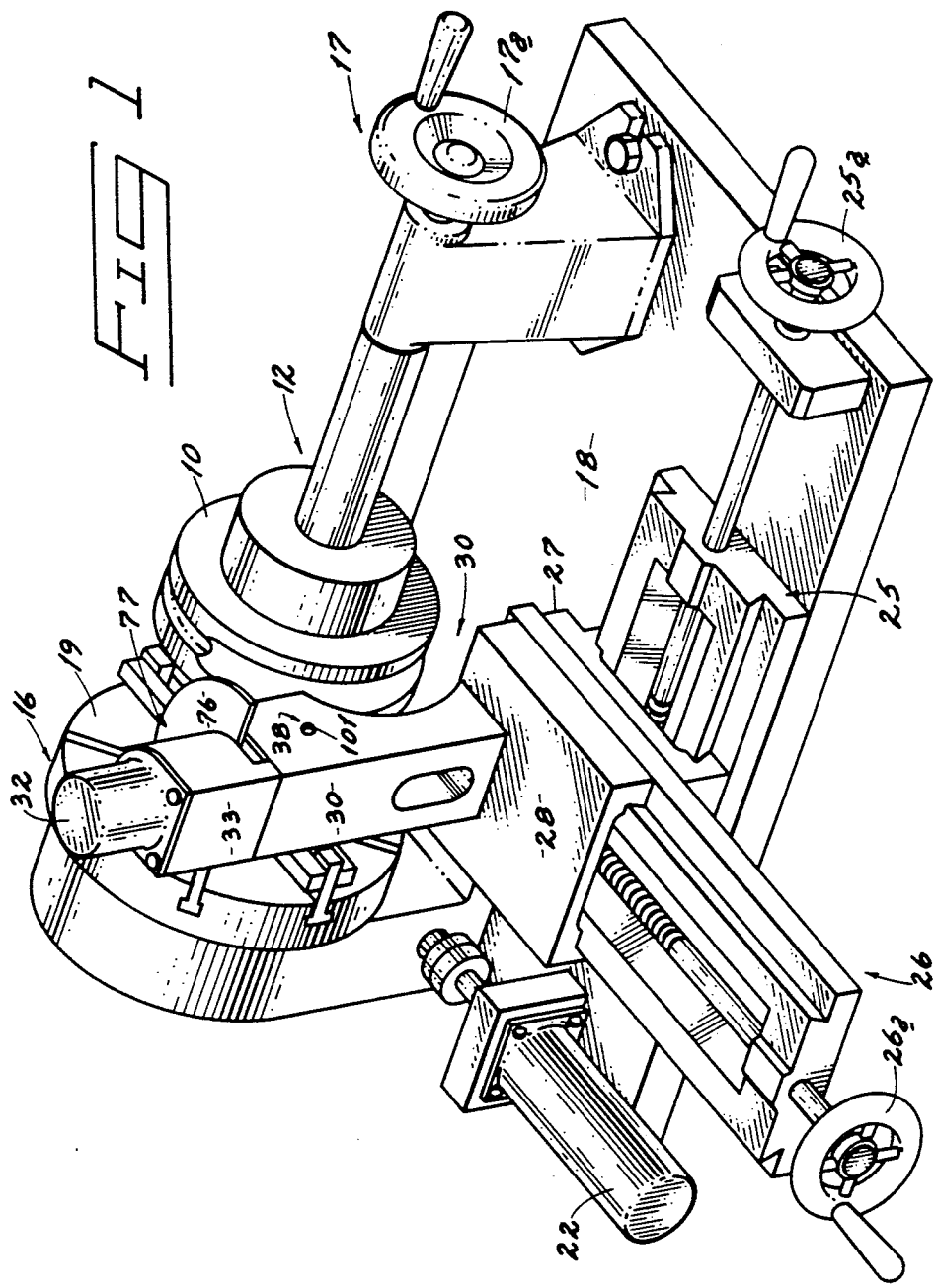
FIG. 1 is an isometric view of a preferred form of the groove measuring gauge of this invention as seen from the rear side.

FIG. 1 is an isometric view showing the general layout of the invention. A die 10 or some other similar workpiece is supported upon an arbor 12 which is held between a centering headpiece 16 and centering tailpiece 17. Centering headpiece 16 and centering tailpiece 17 are rigidly attached to a frame 18. Centering headpiece 16 includes a rotatable face 19. Referring briefly to FIG. 1 therein is shown an angled chuck 20 rigidly mounted to rotatable face 19. Angled chuck 20 has a projection 23 with angled faces 21 which engage and securely hold arbor 12 in a fixed angular relationship with the rotatable face 19. A centering point 23a accurately aligns and positions arbor 12 with respect to the rotation axis of rotatable face 19.

Centering tailpiece 17 has a rotatable point 24 which engages the opposite end of arbor 12 thereby allowing the arbor 12 and die 10 to rotate with respect to frame 18 when rotatable face 19 is rotated. Rotatable point 24 is adjusted into and out of contact with arbor 12 using handle 17a.

Centering headpiece 16 is provided with a stepping motor 22 (FIG. 1) which advances rotatable face 19 at angular increments during the measurement of die 10. Stepping motor 22 is preferably electronically controlled by a computer control means 95 in FIG. 9. Centering headpiece 16, centering tailpiece 17 and stepping motor 22 are well-known in the art and are readily available from machinery suppliers.

A first guideway 25 and second guideway 26 are provided to adjustably position gauge head 30. First guideway 25 is preferably positioned to allow slidable travel parallel to the rotational axis formed between centering headpiece 16 and centering tailpiece 17. Second guideway 26 is rigidly attached to the slidable table 27 of first guideway 25 and preferably is oriented perpendicularly with respect thereto. The gauge head 30 is rigidly attached to the slidable table 28 of second guideway 26. First and second guideways 25 and 26 can be used to precisely position the gauge head 30 with respect to die 10 in the horizontal plane.

Gauge head 30 has a spindle stepping motor 32 mounted thereon using a stepping motor mounting block 33. FIG. 3 shows the arrangement of gauge head 30 and spindle 40 in cross-sectional detail. Spindle 40 is rotatably mounted within gauge head 30 using spindle bearings 41 and 42. Spindle bearings 41 and 42 are preferably angular contact bearings arranged in opposing fashion thereby allowing the spindle to be securely held without clearance or play within gauge head 30. A retainer 35 is used to securely hold the spindle 40 and spindle bearings 41 and 42 within gauge head 30.

Spindle 40 has an enclosed end 44 and an exposed end 43. Exposed end 43 is tapered to a neck portion 45 which allows the gauge to easily be positioned within the confines of a groove as shown in FIG. 5. Spindle 40 has an interior cavity 46 which has openings at both the exposed and enclosed ends. A measuring arm 60 is pivotally mounted within spindle 40. Measuring arm 60 has an enclosed end 61 and an exposed end 62. Exposed end 62 has an outer face 63 which is preferably provided with a contact point 64. Contact point 64 actually touches the interior surface of a groove being measured. Contact point 64 is preferably a small spherical ball attached to outer face 63.

Figure 8:
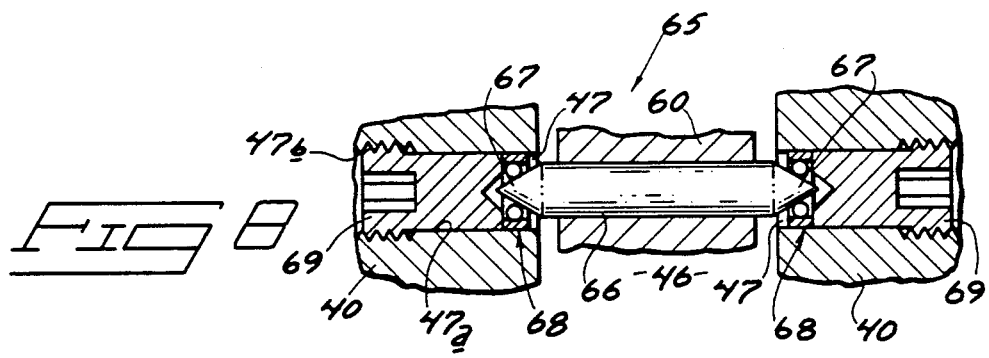
FIG. 8 is an enlarged sectional view of the measuring arm pivot shaft and the bearing arrangement which rigidly supports it within the spindle.

Measuring arm 60 is pivotally mounted within spindle 40 using a measuring arm pivot generally referred to by the reference numeral 65. FIG. 8 shows that measuring arm pivot 65 includes a measuring arm pivot shaft 66 which extends through measuring arm 60. Measuring arm pivot shaft 66 preferably has conically shaped ends 67 which are received by angular contact bearings 68 at both ends. Angular contact bearings 68 are positioned within apertures 47 which extend between interior cavity 46 and the outer surface of spindle 40.

Apertures 47 and the measuring arm pivot axis are offset from the longitudinal spindle axis in order to minimize the trigonometric error associated with the pivotal motion of measuring arm 60 as it swings between the retracted position shown in FIG. 5 in solid lines and the contacting position shown in FIG. 5 in phantom lines.

The apertures 47 each have a smooth portion 47a and a threaded portion 47b. The angular contact bearings 68 snugly fit within smooth portions 47a and are preferably provided with a small interference fit to assure that the measuring arm pivot 65 is precisely located within the spindle 40. Angular contact bearings 68 are advanced into contact with the conical ends 67 using set screws 69 thereby eliminating any clearance between the pivot shaft 66 and spindle 40. This further aids in precisely locating the measuring arm pivot within gauge head 30.

Spindle 40 is provided with openings 48 at both sides to allow for installation and positioning of measuring arm pivot 65. Gauge head 30 is provided with openings 38 so that set screws 69 can be adjusted when spindle 40 is mounted in gauge head 30. Cover screws 101 are provided to keep dust from entering gauge head 30.

Measuring arm 60 is preferably constructed with heavy central section 60a, intermediate exposed section 60b and exposed end section 60c. This stepped structure allows the measuring arm to have greater rigidity while allowing the size of the exposed end to be maintained at a minimum. The enclosed end 61 of measuring arm 60 also has a stepped structure with intermediate enclosed section 62a and enclosed end section 62c. This assures measuring arm rigidity while allowing for easier connection of the measuring arm to the micrometer means 80 because of the small size of enclosed end section 62c.

The micrometer 80 senses movement of the enclosed end 61 of the measuring arm, which is an indication of the movement of contact point 64 on the opposite exposed end 62 of measuring arm 60. The distance between measuring arm pivot 65 and contact point 64 is preferably equal to the distance between measuring arm pivot 65 and the point at which micrometer probe 81 contacts measuring arm 60. This allows the micrometer to directly read the amount of travel without the necessity for scaling. Alternatively, the distances could be different and the micrometer reading could be scaled to compensate.

Figure 7:
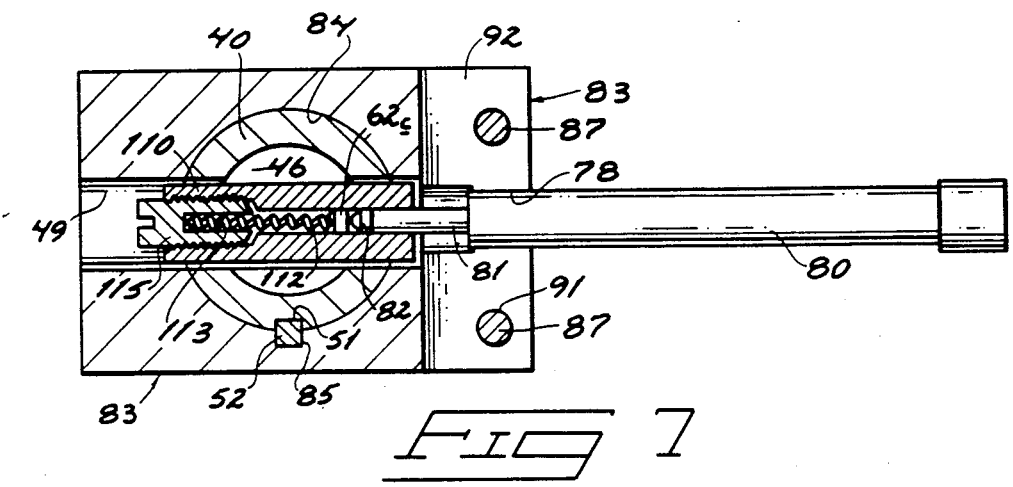
FIG. 7 is an enlarged top view of the micrometer-measuring arm connection means shown in FIG. 3 apart from other parts of the gauge.

Micrometer 80 is mounted upon the gauge as shown most clearly in FIGS. 3 and 7. The micrometer 80 is securely held within micrometer mounting block 83 by extending the outer casing of the micrometer into micrometer opening 78 (see FIG. 6). The micrometer is clamped in a fixed position within mounting block 83 using fasteners 87 which pass through apertures 91 in the mounting block. Micrometer mounting block 83 is provided with a slot 92 so that the block will more easily flex when fasteners 87 are tightened, thereby clamping the micrometer 80 in a fixed position.

The mounting block 83 has a central opening 84 which is properly sized to receive the enclosed end 44 of spindle 40. A micrometer biasing block 110 extends within central cavity 46 of spindle 40 supported by micrometer probe shaft 81 and tip 82. Openings 49 provide clearance for movement of the biasing block 110. The enclosed end section 62c of measuring arm 60 extends through opening 112 of micrometer biasing block 110 and is engaged upon the rearward side by biasing spring 113 or other equivalent biasing means. The compressive force of biasing spring 113 is adjusted by adjustment screw 115.

The frontward side of the measuring arm enclosed end section 62c is engaged by the micrometer probe tip 82 which is connected to micrometer probe shaft 81. The micrometer probe shaft 81, probe tip 82 and biasing block 110 move with the measuring arm enclosed end section 62c. Movement of these parts occurs relative to the remainder of micrometer 80. The micrometer measures the relative position of micrometer probe tip 82 and provides a reading of the position. Micrometer 80 includes an internal biasing means (not shown) which biases the probe tip 82 and probe shaft 81 to extend outwardly from the micrometer 80 to force the enclosed end section 62c of measuring arm 60 rearwardly. This causes the measuring arm contact point 64 to rotate outwardly and contact the surface of the groove being measured. The micrometer 80 is preferably an electronic micrometer which provides an output signal which can be interpreted by computer control and data storage means 95.

The arrangement described above allows the micrometer to be carefully positioned relative to micrometer mounting block 83 and also allows the position of the measuring arm enclosed end section 62c to be very precisely measured, usually to a tolerance of 50 millionths of an inch.

Figure 2:
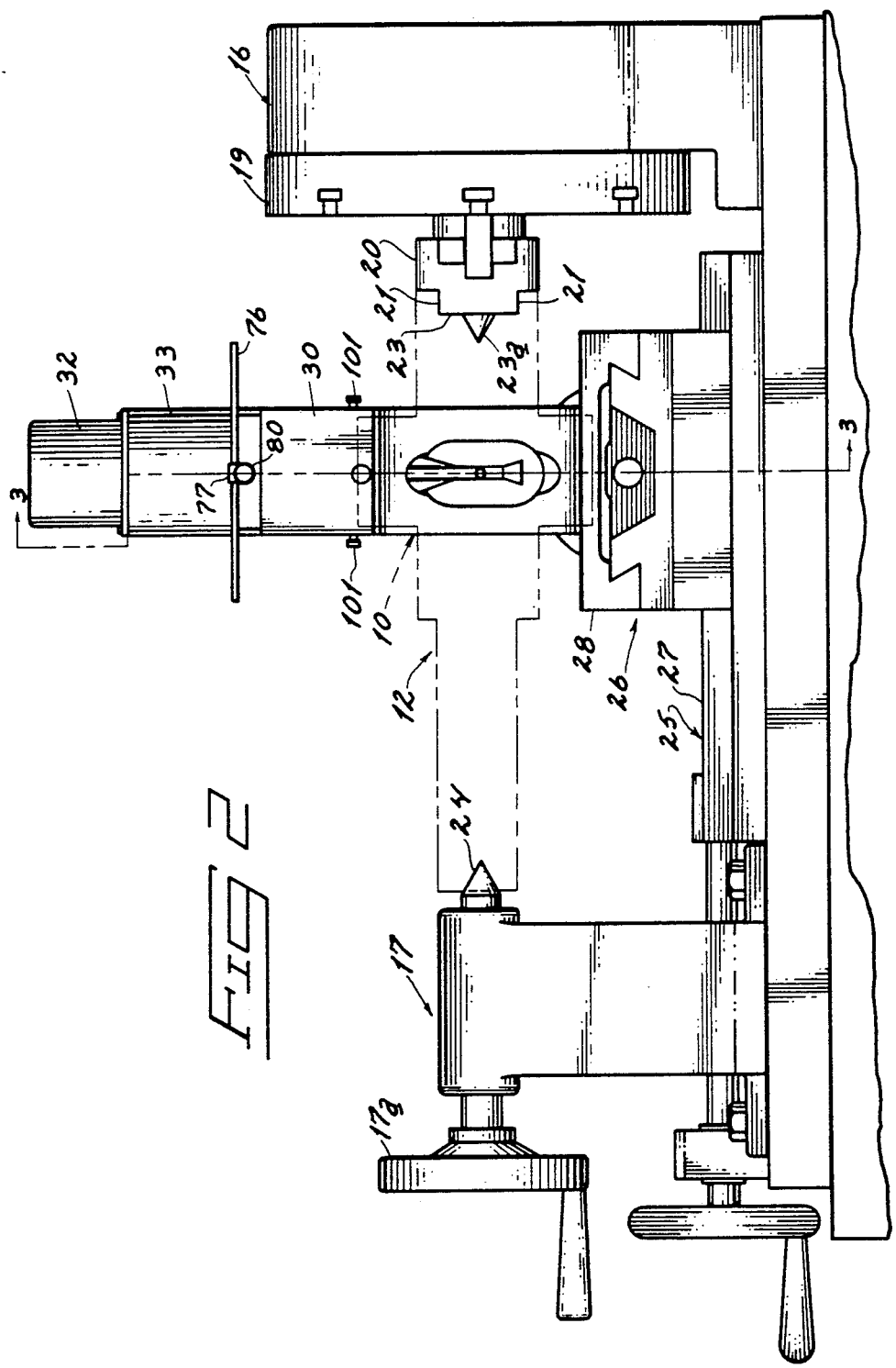
FIG. 2 is a front elevational view of the gauge shown in FIG. 1 with the die and arbor shown in phantom.

Since the micrometer swings as the spindle 40 is rotated, it is desirable to attach a pointer 77 (FIGS. 1, 2 and 3) to the end of the micrometer 80. Pointer 77 is adjacent to a protractor 76 thereby giving an immediately observable reading of the spindle's angular position within gauge head 30.

Micrometer mounting block 83 has a central opening 84 (FIG. 6) which fits about the outside diameter of the enclosed end 44 of spindle 40. Micrometer mounting block 83 is preferably provided with a keyway 85 which is aligned with a keyway 51 in spindle 40. A key 52 (FIG. 3) is inserted therebetween to positively fix the relative position between the micrometer 80 and the spindle 40. Micrometer mounting block 83 has a slot 86 (FIG. 6) which allows the block to be tightened against spindle 40 using fasteners 89 (FIG. 3) which extend through apertures 94 (FIG. 6).

Spindle stepping motor 32 has an output shaft 34 which is received within coupling 71 and secured thereto by set screw 72. Coupling 71 slides over the enclosed end 44 of spindle 40. Coincident rotation of coupling 71 and spindle 40 is provided by key 52 which extends upwardly into slot 74 in coupling 71.

The groove measuring gauge of this invention also preferably includes a computer control and data storage system. The computer control system includes both electronic computer hardware which is readily available and a program which automatically measures and records the cross-sectional measurements of a groove. The computer control system can be used to automatically control the stepping motors to progressively measure the cross-sectional shape of grooves at a number of different cross-sectional positions along the groove. In the case of pilger mill roll dies it is possible to install the die to be measured, position the gauge with respect to the die groove and then have the computer automatically control the measurement of the cross-sectional shapes of the groove at a number of different positions along the groove at preselected angular intervals of the rotatable head 19 of centering headpiece 16. Such computer control systems are well-known in the art and can be implemented using a number of different types of readily available computers. A special purpose microprocessor unit could also be used and is within the contemplation of the term computer for the purposes herein.

Figure 9:
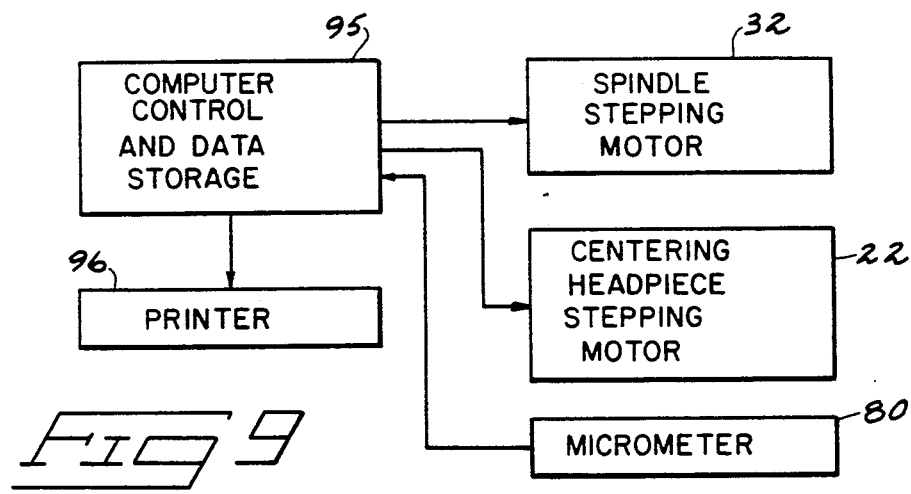
FIG. 9 is a diagram showing the relationship between the computer control means and other parts of the invention.

FIG. 9 shows how the computer control system is connected to the measuring gauge. Computer control and data storage unit 95 is used to control the position of and automatically advance spindle stepping motor 32 and centering headpiece stepping motor 22. Micrometer readings are taken at selected positions of the spindle stepping motor as the spindle 40 rotates within gauge head 30 and progresses across the cross-sectional shape of the groove being measured. When the full profile of the groove has been taken at one particular groove cross section, then the computer control automatically advances headpiece stepping motor 22 to the next angular position and then advances the spindle stepping motor 32 once again across the groove shape with micrometer readings being taken at each of the preselected angular spindle positions. The data is stored by the computer control and data storage system 95 and a printer 96 can be attached in order to print out graphic or numerical representations of the groove profile for each particular cross section over which measurements were taken. Use of the computer system provides for much greater flexibility in data analysis. Additionally the computer control allows the die grooves to be inspected much faster and with very little labor and with much greater accuracy than prior art gauges.

The operation and use of the groove measuring gauge will now be more fully considered. It is first necessary to install the die 10 in the groove measuring gauge. The die is preferably mounted on an appropriate arbor 12 and positioned between the centering headpiece 16 and centering tailpiece 17. Rotatable point 24 of tailpiece 17 is advanced inwardly to engage the end of arbor 12 and to force the projection 23 of angle chuck 20 against the mating channel of arbor 12.

After the arbor 12 and die 10 are securely mounted between the centering headpiece and tailpiece 16 and 17 it is then necessary to properly adjust the position of gauge head 30 so that it is near the center of curvature of groove 11, as shown in FIG. 5. Gauge head 30 is positioned by using the first and second guideways 25 and 26. It is preferable to first adjust the first guideway 25 using handle 25a so that the rotational axis of spindle 40 lies within a transverse plane which divides the die groove in half. The second guideway 26 is then adjusted using the handle 26a so that the rotational axis of spindle 40 positioned approximately at the center of curvature of the groove being measured. FIG 5 shows an appropriate position for the exposed end 43 of spindle 40 with respect to the groove 11. The shape of groove 11 is not necessarily semicircular. It may have multiple radii of curvature, or otherwise be complexly shaped. In such cases it is only necessary to position the spindle axis at an appropriate reference position so as to allow the measuring arm contact point 64 to contact the inner surfaces of the groove. In most cases the groove will be approximately symmetrical about a bisecting transverse plane. It the spindle axis is adjusted so that it lies along this bisecting plane at the outside diameter of the die, then proper interpretation of the measurements will be simplified.

When the computer control system is used, it is possible to include a program subroutine which will automatically measure the coordinates of the grooved surface and from those measurements give an instruction for adjustment of the first and second guideways 25 and 26 in order to properly and exactly position the spindle axis. Such a subroutine allows the position of the gauge head to be more quickly adjusted, thereby minimizing the amount of time necessary to set up the gauge for measurement.

Once the adjustment of the first and second guideways 25 and 26 has been completed, then the machine is ready for automatic measurement of the groove contours. This is accomplished by starting the gauge at an appropriate angular position of the centering headpiece 16. The computer control is then started with preprogrammed instructions as to the angular positions at which measurements should be taken both with regard to the centering headpiece 16 and with regard to the spindle 40.

It is preferable to have the centering headpiece situated at a particular angular orientation and then have the spindle stepping motor 32 advance at predetermined intervals thereby providing micrometer readings at fixed angular intervals across the curvature of the groove 11. The spindle preferably rotates across approximately 180° of arc to measure the entire groove contour at any particular cross-sectional position. When all of the measurements for a particular groove cross-section have been taken then the centering headpiece 16 is automatically advanced a predetermined angular amount by headpiece stepping motor 22 as controlled by the computer. The spindle stepping motor 32 is then advanced through a preprogrammed sequence of positions at predetermined angular intervals across the contours of the next groove cross-section. Micrometer measurement data for each position is stored in the computer system. This process is repeated until all the desired angular positions of the rotating face 19 of centering headpiece 16 have been measured.

The data accumulated by the automatic measurement of the groove 11 allows the operator or engineer to fully analyze the condition of the die and to make a recommendation as to whether it should be replaced or repaired. Previously repaired dies can also be inspected to assure that their groove contours are appropriate for use on the mill. The computerized data storage allows measurements of a great number of dies to be easily stored and analyzed so as to facilitate advancements in the shape and use of the mill dies.

The above description of the invention has been generally given in the context of a pilger mill roll die. Many other machined grooves may alternatively be measured with much greater speed and accuracy using the groove measurement gauge of this invention.

The apparatus described above can be made according to well-known metal working and manufacturing techniques. Manufacture of the various components will be apparent to one of ordinary skill in the art upon inspection of the drawings and specification.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A groove measuring gauge for measuring the contours of a groove in a workpiece, comprising:
   a frame;
   a rotatable centering headpiece rigidly attached to the frame for supporting the workpiece;
   a rotatable centering tailpiece rigidly attached to the frame for supporting the workpiece;
   a gauge head connected to the frame and extending adjacent to a workpiece supported between said centering headpiece and tailpiece;
   a spindle rotatably supported within the gauge head for rotation about a spindle axis; the spindle being supported by at least two spaced apart spindle bearings, the spindle bearings being angular contact bearings arranged in an opposed fashion to eliminate clearance between the spindle and the gauge head and very precisely position the spindle;
   a measuring arm pivotably mounted within the spindle at a measuring arm pivot which is transverse to the spindle axis; the measuring arm pivot being positioned between at least two of the spindle bearings to provide optimum rigidity; the measuring arm having an enclosed end and an exposed end, the exposed end having an outer face which extends from the spindle as the measuring arm is pivoted, to engage the surfaces of the groove; and
   micrometer means connected to the spindle and connected to the enclosed end of the measuring arm for detecting and measuring the position of the measuring arm; and
   biasing means for biasing the measuring arm outer face into an extended position.

2. The groove measuring gauge of claim 1 further comprising:
   a first guideway attached to the frame and slidably adjustable with respect thereto; and
   a second guideway attached to the first guideway and slidably adjustable with respect thereto; said second guideway haing the gauge head rigidly attached thereto for adjustable motion of the gauge head with respect to the centering headpiece and tailpiece.

3. A groove measuring gauge of claim 2 wherein the first and second guideways are mounted at right angles to each other.

4. The groove measuring gauge of claim 1 wherein the centering headpiece is provided with a headpiece stepping motor for angularly positioning the headpiece and the workpiece supported thereby to allow the gauge to measure the groove at a variety of cross-sectional positions.

5. The groove measuring gauge of claim 1 wherein the spindle is connected to a spindle stepping motor for angularly positioning the spindle within the gauge head to allow the measuring arm outer face to contact the inside of the groove at a plurality of positions.

6. The groove measuring gauge of claim 1 further comprising a micrometer mounting block for rigidly connecting the micrometer means to the spindle.

7. A groove measuring gauge for measuring the contours of a groove in a workpiece comprising:
   a frame;
   a rotatable centering headpiece rigidly attached to the frame for supporting the workpiece;
   a rotatable centering tailpiece rigidly attached to the frame for supporting the workpiece;
   a gauge head connected to the frame and extending adjacent to a workpiece supported between said centering headpiece and tailpiece;
   a spindle rotatably supported within the gauge head for rotation about a spindle axis;
   a measuring arm pivotably mounted within the spindle at a measuring arm pivot which is transverse to the spindle axis; the measuring arm having an enclosed end and an exposed end, the exposed end having an outer face which extends from the spindle as the measuring arm is pivoted, to engage the surfaces of the groove; and
   electronic micrometer means connected to the spindle and connected to the enclosed end of the measuring arm for detecting and measuring the position of the measuring arm;
   a headpiece stepping motor connected to the centering headpiece for angularly positioning the headpiece and a workpiece supported thereby;
   a spindle stepping motor connected to the spindle for angularly positioning the spindle; and
   computer control and data storage means electrically connected to the headpiece stepping motor, spindle stepping motor, and electronic micrometer means for automatically recording the measurements from the micrometer means for positions of the headpiece and spindle stepping motors and for automatically advancing the stepping motors in a preprogrammed sequence of positions so as to obtain micrometer measurement data for a groove in a workpiece.

8. The groove measuring gauge of claim 7 further comprising printer means connected to said computer control and data storage means for providing a graphical and numerical printout of groove measurements.

9. A groove measuring gauge for automatically measuring the interior contours of the groove of a pilger mill roll die, comprising:

a frame;

a rotatable centering headpiece rigidly attached to the frame for supporting the die;

a rotatable centering tailpiece rigidly attached to the frame for supporting the die;

a first guideway attached to the frame and slidably adjustable with respect thereto;

a second guideway attached to the first guideway and slidably adjustable with respect thereto;

a gauge head rigidly attached to the second guideway and adjustable in position with respect to the centering headpiece and tailpiece using said first and second guideways;

a spindle rotatably mounted within the gauge head for rotation about a spindle axis;

a measuring arm pivotally mounted within the spindle at a measuring arm pivot which is transverse to the spindle axis; the measuring arm having an enclosed end and an exposed end, the exposed end having an outer face which extends from the spindle as the measuring arm is pivoted, to engage the surfaces of the groove;

electronic micrometer means connected to the spindle and connected to the enclosed end of the measuring arm for detecting and measuring the position of the outer face of the measuring arm;

a headpiece stepping motor connected to the centering headpiece for angularly positioning the die workpiece;

a spindle stepping motor connected to the spindle for angularly positioning the spindle and measuring arm with respect to the gauge head; and computer control and data storage means connected to the first stepping motor, second stepping motor, and electronic micrometer means, for automatically positioning the headpiece and spindle stepping motors and for recording the groove measurements at particular positions of the stepping motors.

10. The groove measuring gauge of claim 9 wherein the computer control and data storage means is programmed to automatically position the headpiece and spindle stepping motors through a sequence of positions.

11. The groove measuring gauge of claim 10 wherein the spindle is rotatably mounted within the gauge head using two angular contact bearings to very precisely position the spindle axis by eliminating bearing clearance.

12. The groove measuring gauge of claim 11 wherein the measuring arm pivot is supported between two angular contact bearings to very precisely position the pivot by eliminating bearing clearance.

13. The groove measuring gauge of claim 10 wherein the measuring arm pivot comprises a pivot shaft having conical ends which are received by angular contact bearings; said angular contact bearings being positioned within apertures so as to have a small interference fit therewith to precisely position the measuring arm pivot; said angular contact bearings being adjustable by set screws threadably received in the spindle.

14. The groove measuring gauge of claim 10 wherein the outer face of the measuring arm has a contact point mounted thereon and located at a position so that the distance from the contact point to the measuring arm pivot equals the distance from the measuring arm pivot to the connection of the measuring arm to the micrometer means.

15. A gauge head assembly for use in groove measuring gauges to measure the contours of a groove in a workpiece, comprising:

a gauge head for connection to a frame forming a part of the groove measuring gauge;

a spindle rotatably supported within the gauge head for rotation about a spindle axis; the spindle being supported by at least two spaced apart spindle bearings, the spindle bearings being angular contact bearings arranged in an opposed fashion to eliminate clearance between the spindle and the gauge head and very precisely position the spindle;

a measuring arm pivotably mounted within the spindle at a measuring arm pivot which is transverse to the spindle axis; the measuring arm pivot being positioned between at least two of the spindle bearings to provide optimum rigidity; the measuring arm having an enclosed end and an exposed end, the exposed end having an outer face which extends from the spindle as the measuring arm is pivoted, to engage the surfaces of the groove;

brasing means for biasing the measuring arm outer face into an extended position.

16. The gauge head assembly of claim 15 wherein the measuring arm pivot is supported between two opposed angular contact bearings to very precisely position the pivot by eliminating bearing clearance.

17. The gauge head assembly of claim 15 wherein the measuring arm pivot is offset from the longitudinal spindle axis toward the outer face of the measuring arm, to reduce trigonometric error.

18. The groove measuring gauge of claim 15 wherein the measuring arm pivot comprises a pivot shaft having conical ends which are received by angular contact bearings; said angular contact bearings being positioned within apertures so as to have a small interference fit therewith to precisely position the measuring arm pivot; said angular contact bearings being adjustably positioned by set screws threadably received in the spindle.

* * * * *